Patented Apr. 19, 1927.

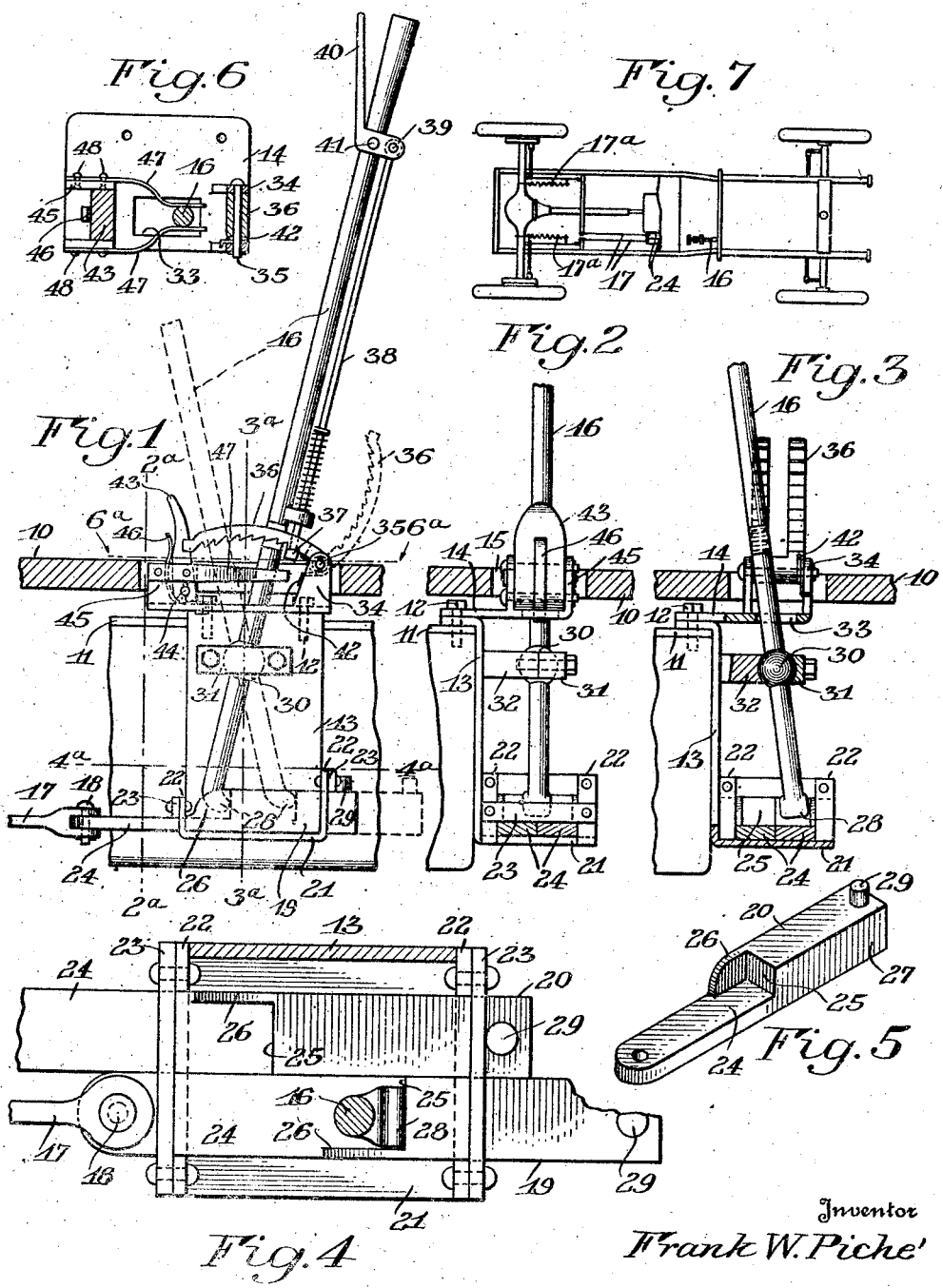

1,625,151

UNITED STATES PATENT OFFICE.

FRANK W. PICHÉ, OF DETROIT, MICHIGAN.

BRAKE MECHANISM FOR VEHICLES.

Application filed June 1, 1925. Serial No. 33,954.

The invention relates to vehicles and more particularly to brake mechanism for the same, one object of the invention being to provide a practical and advantageous mechanism of this character operating in a convenient manner for braking the tractive wheels or members of a vehicle simulaneously as in controlling the speed of the vehicle, or for braking the wheels individually and selectively as useful under certain conditions.

Another object is the provision of such a mechanism particularly adapted for use with motor vehicles having a pair of differentially driven wheels, for not only braking both wheels simultaneously, but also restraining the drive through a selected one of the wheels to direct the driving force to the other wheel, as frequently desirable, for example, where one of the wheels is ditched, or for some other reason has lost its grip upon the ground.

A further object is to provide a vehicle having braking mechanism with locking means therefor operative exclusively while the brake mechanism is adjusted for braking both wheels together, so that as a matter of safety the brake cannot be locked on either of the wheels alone.

Still a further object is to provide brake control means comprising a control element movable to different positions for selectively braking either or both of the wheels and having also an actuating movement for applying the brakes in the different selected positions, together with an advantageous locking device for the element operating exclusively in the position of the latter for braking both wheels and also serving to releasably retain the element in such selected position, the locking device being releasable from cooperation with the element when it is desired to position the latter for braking the wheels individually.

To these and other ends the invention resides in certain improvements and combinations of parts, all as will be hereinafter more fully described, the novel features being pointed out in the claims at the end of the specification.

In the drawings:—

Figure 1 is a side elevation of a mechanism embodying the present invention with the floor of the vehicle to which it is applied shown in section;

Figure 2 is a rear elevation of the same substantially as viewed from the line 2ª—2ª in Figure 1;

Figure 3 is a sectional elevation on the line 3ª—3ª in Figure 1 but with the parts in a different position;

Figure 4 is an enlarged sectional plan view on the line 4ª—4ª in Figure 1;

Figure 5 is a perspective view of a shift bar detached;

Figure 6 is a sectional plan taken on line 6ª—6ª of Figure 1, and

Figure 7 is a diagrammatic plan view of the mechanism applied to a vehicle.

Similar reference numerals throughout the several views indicate the same parts.

The present application is a continuation in part of an application filed by me December 26, 1923, bearing Serial No. 682,605.

The preferred embodiment of the invention herein disclosed by way of illustration of the principles involved, shows the application thereof to a vehicle having brake mechanism for its tractive wheels or members actuated by the usual brake rods extending forwardly adjacent the driver's seat, where the control mechanism is installed in an opening in the floor as in the case of the emergency brake mechanism in common use in automobiles. The invention comprises, generally speaking, a control element or lever having a selective movement to position the same for cooperation with the brakes to actuate the latter either individually and selectively or both together, and provided with a device for holding or locking the lever after actuation in its position for simultaneously applying both brakes, the locking device being inoperative when the lever is shifted to position for actuating the brakes individually, so that the brake cannot be locked in application to either wheel separately.

Referring more particularly to the drawings, there is shown at 10, Figure 1, the floor of a vehicle below which is represented generally at 11 any suitable supporting means such as a bracket or a portion of the frame of the car. Mounted on this means and secured thereto as by a bolt 12 is a substantially L shaped bracket 13 and also a bracket arm 14 for supporting the various parts of the control mechanism below an opening 15 in the floor through which extends the control element, preferably a lever 16.

The invention is applicable to different types of brakes such as the wheel drum and brake band type, and the usual brake rods are represented at 17 as extending forwardly from the rear wheels to the brake control mechanism, being pivotally connected at their forward ends as at 18 to the rear ends respectively of a pair of shift rods or bars 19 and 20 sliding longitudinally in a carriage or holder formed at the lower horizontally disposed end of bracket 13. Brake release springs may be provided at any desired points, for example, as shown at 17ª in Figure 7, or within the brake drums if preferred. The horizontal bracket portion 21 has upstanding posts 22 at its corners, the rear pair of such posts being of less height than the forward pair as shown. The posts 22 are connected adjacent their upper ends by transverse bars 23 between which and the bracket portion 21 the bars 19 and 20 slide in contact with each other inside the posts 22. These bars are shifted forwardly in the carriage either together or individually for braking both wheels simultaneously or either one thereof as desired.

The shift bars have in addition to the rear portions 24 to which the brake rods are attached, an intermediate socket portion having in the present instance an abutment or shoulder 25 and a rearwardly extending wall or wing 26 at the outer face of the bar. Each bar is provided also at its opposite side with a wall 27 of the height of shoulder 25 and extending from the latter adjacent the forward end of the bar which is afforded by constructing the bar with a thickened forward end equal in height to the shoulder. The shift bars are thus adapted for cooperation with a selector portion 28 on the lower end of the control lever 16. The latter, as hereafter described, is supported intermediate its ends for universal movement whereby the selector portion may be shifted transversely into engagement with the shoulder 25 of either of the shift bars as illustrated in Figures 3 and 4, or positioned centrally in engagement with the shoulders of both bars simultaneously, as shown in Figure 2. The wing 26 and shoulder 25 of each shift bar form together a socket for the reception of the selector portion 28 of the lever, serving to guide the latter in its transverse movements. Upwardly projecting stop pins 29 limit the rearward movement of the shift bars to normal position when in engagement with the front transverse bar 23.

The control lever 16 is in the present instance formed intermediate its ends with a ball portion 30 working in a socket 31 of the usual or any suitable variety on an arm 32 projecting from the bracket 13, but of course the lever may be otherwise suitably supported for the desired movement thereof, comprising the selective movement substantially about an axis transverse thereto, to position the lever as already described, for cooperation with either or both of the shift bars, and also a forward and rear actuating movement for actuating either bar separately or both at the same time as may be desired. The lever is pulled rearwardly at its upper end to move its lower selector portion forwardly to actuate the brake, suitable spring means such as shown at 17ª acting on the brake rods serving to return the parts to normal inoperative position.

It is desirable of course in mechanism of this character to provide for releasably holding or locking the mechanism with the brakes applied to both wheels simultaneously, as for example where it is desired to hold the car stationary on an incline. It would be exceedingly dangerous however to lock the brake on a single one of the wheels because of the resulting effect of suddenly veering the car out of its course through the retardation of one wheel and increased driving force applied to the other. It is in fact unnecessary to provide means for locking the brakes on one wheel at a time as in this selective use the mechanism can be conveniently controlled entirely by hand. It has accordingly been found feasible to so construct the mechanism that it may be locked in position for braking both wheels but not for braking a single wheel alone and the invention provides a safe reliable and otherwise advantageous device for accomplishing this desirable result.

The locking device for the mechanism is carried by the bracket arm 14 which is formed with an opening 33 through which the lever 16 extends. The arm has at each of its forward corners a post 34 and between the upper ends of these posts a spindle 35 pivotally supports the forward end of a U-shaped or bifurcated member 36, one or both arms of which are provided on the under surface with rearwardly inclined ratchet teeth as shown. The ratchet member may be swung from the inactive position shown in dotted lines in Figure 1 to the active position shown in full lines in which it embraces lever 16. In this position the ratchet member cooperates with a pawl 37 carried at the lower end of a spring actuated rod 38 guided on and extending upwardly of the lever into pivotal connection at 39 with a hand-piece 40 pivoted adjacent the upper end of the lever as at 41 for controlling movement of the pawl toward and from the ratchet. The ratchet sector is preferably urged to its inactive position by spring means 42 coiled about its spindle 35, the sector being secured in the active position shown by a latch 43 pivoted at 44 between upstanding posts 45 on the rear end of bracket arm 14. A spring 46 normally urges the latch to position for engagement with the ratchet sector but when the latch is moved by the foot of the operator, for example, to release the sector, the latter swings automatically to inactive position.

It is apparent from the above construction that with the lever 16 in normal position for braking both wheels, ratchet sector 36 may be moved to and secured in position for locking cooperation with the lever and for retaining the latter in such normal position, in which arrangement of the parts it is impossible to brake the wheels individually. When, however, it is desired to apply the brake to the wheels selectively, as for example to retard a wheel which spins idly through failure to grip the ground and to thereby direct the driving force into the opposite wheel, the operator trips the latch 43 so that the ratchet sector is moved to inactive position. This frees lever 16 for selective movement to engage the shift bars individually after which the lever may be moved to actuate and apply the brake to the selected wheel for as long a period as necessary, the lever being at such times free for rapid operation with such force as may be required without interference by the locking device. When the lever is released after such use the mechanism returns of course to normal position under the action of the brake releasing springs 17ª. When such selective operation of the mechanism has accomplished its purpose lever 16 is again moved to its normal central position and so retained by relatching the ratchet sector in active position.

Means is also provided for automatically returning the lever or control member 16 to normal position, as shown in Figure 2, after release from either selective braking position and subsequent to the realignment of the shoulders 25 on the shift bars 19 and 20, which is automatically effected by the springs 17ª as will be understood. The means provided for the lateral or transverse return movement of the lever to central position comprises one or more springs 47, preferably two, which are conveniently shown as leaf springs extended on the opposite sides of the lever below the locking bar 36, but which may be disposed at any point suitable for accomplishing the desired results. The springs 47 are preferably supported by the lugs 45 carrying the pivot pin 44 of the latch 43 and are secured to the lugs by rivets 48 as shown in Figure 6. The springs 17ª and 47 both act to return the lever from the braking position corresponding to that shown by dotted lines in Figure 1 and in section in Figure 4, which is one of the selective brake applying positions from which the lever will be returned automatically when released by the operator with the lock bar 36 in the dotted line position shown in Figure 1. However, the lever when released from the position at which it is effective to apply both sets of brakes will be returned by the springs 17ª alone if the pawl 37 is kept in release position by the operator.

While the invention has been described as applied to the control of vehicle brakes, it is obvious that it is capable of application also to other apparatus, such, for example as tractors of the variety steered by the differential application of power to the traction members, and the exemplary embodiment herein disclosed is of course capable of various modifications within the scope of the appended claims.

I claim as my invention:

1. An apparatus of the character described comprising separate brakes for a pair of traction members, a control element for said brakes having a selective movement to position the same for cooperation with either of said brakes individually or with both thereof simultaneously and also an actuating movement for actuating either or both of said brakes in accordance with said selective movement, and a device for releasably locking said element in adjusted brake actuating position operative exclusively when said element is positioned for actuating both brakes simultaneously.

2. The combination with a vehicle having steering wheels and a pair of traction wheels provided with separate brake means, control mechanism for said brake means adjustable selectively for cooperation with either of said means individually or with both thereof together and movable to actuate either or both of said means in accordance with said selective adjustment, and a releasable locking device for said mechanism operative during said movement thereof for actuating both of said means together but inoperative during said movement of the mechanism for actuating said means individually.

3. The combination with a vehicle having steering wheels and a pair of wheels provided with separate brake means, of a control lever for said brake means having a selective movement to position the same for cooperation with either of said means individually or with both thereof together and also an actuating movement for actuating either, or both of said means together in accordance with said selective movement, and a device operative to releasably lock said lever in adjusted position when the latter is moved to actuate said means together but inoperative when said lever is moved to actuate either of said means individually.

4. The combination with a motor vehicle having a pair of differentially driven wheels provided with separate brakes, of a control lever for said brakes having a swinging movement substantially about an axis transverse thereto for cooperation selectively with either of said brakes individually, or with both thereof simultaneously, and also a second movement for actuating either or both of said brakes as selected by said first movement, and a device for releasably locking said lever in adjusted brake actuating position operative exclusively when said lever is positioned for actuating both of said brakes simultaneously.

5. The combination with a vehicle having a pair of wheels provided with separate brake means, of control mechanism for said means adjustable selectively for cooperation with either of said means individually or with both thereof together and movable to actuate either or both of said means together in accordance with said selective adjustment, and a locking device for said mechanism adjustable to operative and inoperative positions and serving in said operative position to maintain said mechanism in adjustment for co-operation with both of said means together exclusively.

6. The combination with a vehicle having a pair of wheels provided with separate brake means, of a control lever having a selective movement to position the same for cooperation with either of said means individually or with both thereof together and also an actuating movement to actuate either or both of said means in accordance with said selective movement, a pawl on said lever, and a ratchet movable toward and from active position relative to said pawl and lever when the latter is moved to the position exclusively for actuating both of said means together and operating in said active position to retain said lever in position for actuating both of said means.

7. The combination with a vehicle having a pair of wheels provided with separate brake means, of a control lever mounted for universal movement and having a selector portion adapted to be brought by such movement selectively to position for actuating either of said brake means individually or with both thereof together, a pawl on said lever, and a bifurcated ratchet movable toward and from active position for embracing said lever in coaction with said pawl when said lever is positioned for actuating both of said means together and serving in said active position to guard and retain said lever in said position for actuating both of said means.

8. The combination with a vehicle frame having a pair of traction members and a brake for each of the members, an operating member, selectively operable control means for connecting the operating member with either of said brakes, and releasable locking means for the operating member adapted when in locking position to prevent selective operation of said control means but permitting simultaneous operation of said brakes.

9. The combination with a vehicle frame having a pair of traction members and a brake for each of the members, an operating member, selectively and separably movable control devices for coupling the operating member with either of the brakes, and releasable locking means for the operating member adapted when in locking position to prevent selective operation of said control devices but permitting simultaneous operation of said brakes.

10. The combination with a vehicle frame having a pair of traction members and a brake for each of the members, an operating member, selectively operable control devices for coupling the operating member with either of said brakes, and releasable locking means for the operating member adapted when in one position to permit said operating member to actuate both of said control devices, but preventing selective operation of the same and adapted when in another position to permit selective operation and to prevent locking of either brake in service position.

11. The combination with a vehicle frame having a pair of traction members and a brake for each of the members, an operating member mounted for movement in different planes, selectively operable control devices for coupling the operating member with either of said brakes, and releasable locking means for the operating member adapted when in one position to limit the operating member to movement in a single plane whereby to effect operation of both of said control devices, and adapted when in another position to permit movement of the operating member in different planes to afford selective operation of the control devices.

12. The combination with a vehicle having steering wheels and a pair of traction wheels provided with separate brake means, control mechanism for said brake means adjustable selectively for cooperation with either of said means individually or with both thereof together and movable to actuate either or both of said means in accordance with said selective adjustment, and a locking device for said mechanism movable to operative and inoperative positions and provided with means for moving the same to inoperative position when said mechanism is adjusted for cooperation with either of said means individually.

13. The combination with a vehicle having steering wheels and a pair of traction wheels provided with separate brake means, control mechanism for said brake means adjustable selectively for cooperation with either of said means individually or with both thereof together and movable to actuate either or both of said means in accordance with said selective adjustment, a locking device for said mechanism movable to operative and inoperative positions and provided with means for automatically moving the same to inoperative position by the adjustment of said mechanism for cooperation with said means individually.

14. The combination with a vehicle having steering wheels and a pair of traction wheels provided with separate brake means, control mechanism for said brake means adjustable selectively for cooperation with either of said means individually or with both thereof together and movable to actuate either or both of said means in accordance with said selective adjustment, and a pawl and quadrant ratchet for releasably locking said mechanism having a relative movement to operative and inoperative positions and provided with means for effecting said movement to inoperative position when said mechanism is adjusted for cooperation with said means individually.

15. The combination with a vehicle frame having a pair of traction members and a brake for each of the members, an adjustable operating member, selectively operable control means for coupling the operating member with either of said brakes and releasable locking means for the operating member adapted to be rendered inoperative by the selective operation of said control means to prevent locking of said operating member when coupled with said brakes individually.

16. The combination with a vehicle frame having a pair of traction members, an operating member, selectively operable control devices for coupling the operating member with said brakes, and a locking device for the operating member embodying spaced members adapted to extend on opposite sides of the operating member to prevent movement of the same to selective brake applying position and movable to permit adjustment of the operating member to engage and actuate either of said control devices.

17. An apparatus of the character described, comprising separate brakes for a pair of traction members, a control element for said brakes having a selective movement to position the same for cooperation with either of said brakes individually or with both thereof simultaneously, and also an actuating movement for actuating either or both of said brakes in accordance with said selective movement, a device for releasably locking said element in adjusted brake actuating position operated exclusively when said element is positioned for actuating both brakes simultaneously and means for automatically returning said control element to normal position when released from selective braking position.

18. The combination with a vehicle having steering wheels and a pair of traction wheels provided with separate brake means, control mechanism for said brake means adjustable selectively for cooperation with either of said means individually or with both together and movable to actuate either or both of said means in accordance with said selective adjustment, a releasable locking device for said mechanism operative during said movement thereof for actuating both of said means together, but inoperative during said movement of the mechanism for actuating said means individually and means for automatically returning said control mechanism to normal position when released from selective braking position.

19. The combination with a vehicle having a pair of wheels provided with separate brake means, of control mechanism for said means adjustable selectively for cooperation with either of said means individually or with both thereof together and movable to actuate either or both of said means together in accordance with said selective adjustment, a locking device for said mechanism adjustable to operative and inoperative positions and serving in said operative position to maintain said mechanism in adjustment for cooperation with both of said means together exclusively, and means for automatically returning said control mechanism to normal position when released with the locking device at inoperative position.

20. The combination with a vehicle frame having a pair of traction members and a brake for each of the members, an operating member, selectively operable control means for coupling the operating member with either of said brakes, releasable locking means for the operating member adapted when in locking position to prevent selective operation of said control means and means adapted to automatically return the operating member to normal position when released from selective braking position.

21. The combination with a vehicle frame having a pair of traction members and a brake for each of the members, an operating member, selectively operable control devices for coupling the operating member with said brakes, releasable locking means for the operating member adapted when in one position to permit said operating member to actuate both of said control devices, but preventing selective operation of the same and adapted when in another position to permit selective operation and to prevent locking of either brake in selective position, and means adapted to automatically return the operating member to normal position when released from selective braking position.

22. The combination with a vehicle frame having a pair of traction members and a brake for each of the members, an operating member mounted for movement in different planes, selectively operable control devices for coupling the operating member with said brakes, releasable locking means for the operating member adapted when in one position to limit the operating member to movement in a single plane whereby to effect operation of both of said control devices, and adapted when in another position to permit movement of the operating member in different planes to afford selective operation of the control devices, and means adapted to automatically return the operating member to normal position when released from selective braking position.

23. The combination with a vehicle frame having a pair of traction members and a brake for each of said members, a pair of brake operating members having transversely extending abutments, guiding means for said members permitting longitudinal movement of the same and serving to hold them against lateral movement and a control element for said operating members through which either one is rendered ineffective by movement of said element with respect to said abutments, said element being adapted in one position to engage both abutments to permit simultaneous application of the brakes and being movable from the last mentioned position directly in a single transverse plane into selective operating position with respect to either abutment.

24. The combination with a vehicle frame having a pair of traction members and a brake for each of said members, a pair of shift rods operatively connected with said brakes, control means for said rods through which either one is rendered ineffective by movement of said means to different positions, said control means having one position permitting simultaneous operation of the rods and being movable from the last mentioned position to either of the other positions in a single plane, and releasable locking means for said control means movable independently of the latter to release position.

FRANK W. PICHÉ.